F. E. POWELL AND P. M. McNARY.
ANTI-SPARROW-ROOSTING DEVICE.
APPLICATION FILED OCT. 10, 1921.

1,435,940.

Patented Nov. 21, 1922.

Inventors
Frederick E. Powell
Peter M. McNary

By
Howard E. Barlow
Attorney

Patented Nov. 21, 1922.

1,435,940

UNITED STATES PATENT OFFICE.

FREDERICK E. POWELL AND PETER M. McNARY, OF PROVIDENCE, RHODE ISLAND.

ANTI-SPARROW-ROOSTING DEVICE.

Application filed October 10, 1921. Serial No. 506,591.

*To all whom it may concern:*

Be it known that we, FREDERICK E. POWELL and PETER M. MCNARY, citizens of the United States, residing at Providence, in the county of Providence and State of Rhode Island, have invented certain new and useful Improvements in Anti-Sparrow-Roosting Devices, of which the following is a specification.

The object of this invention is to provide an antisparrow-roosting device adapted more particularly to be attached to the side of a house at a point above the blind catch so as to prevent sparrows or other birds from roosting upon the catch member.

A further object is to provide in such a device a body member provided with a plurality of radially-disposed prongs adapted to be rotatably connected to the side of a house above the blind catch.

With these and other objects in view, the invention consists of certain novel features of construction, as will be more fully described, and particularly pointed out in the appended claims.

Figure 1:
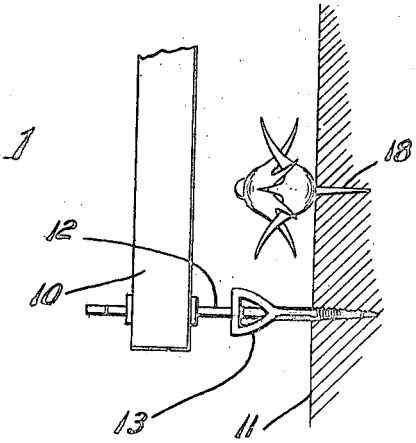
Figure 1 is an elevation showing a portion of a house in section and the free edge of the blind as secured back against the side of the house by means of a catch, also showing our improved antisparrow-roosting device located above the catch.
Figure 2:
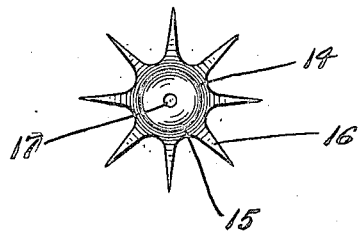
Figure 2 is a front view of one of a pair of cup-shaped members forming the body of the device.
Figure 3:
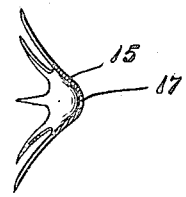
Figure 3 is a sectional elevation showing the cup-shaped form of one of the pairs of body members.
Figure 4:
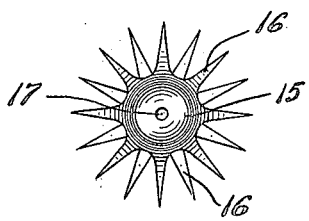
Figure 4 is a front view showing a pair of body members with their prongs interlocking.
Figure 5:
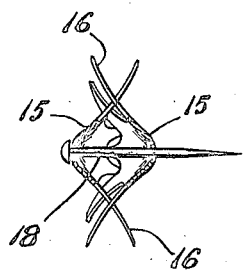
Figure 5 is a sectional elevation showing a pair of cup-shaped members oppositely disposed with their prongs interlocking and a pin through both on which they may be rotated.

It is found in practice where blinds are used upon a house that the catch member which is employed for holding a blind back in open position serves as a convenient and attractive place for sparrows and other birds which deface the woodwork, and to prevent such roosting we have provided a pronged device adapted to be readily attached to the side of a house or to the blind at a point above the catch, and the following is a detailed description of one means by which this result may be accomplished:—

With reference to the drawings, 10 designates the edge of a blind which is swung back against the side of the house 11 and is secured in position by means of the usual hook 12 and eye member 13 which form the usual releasable catch.

At night in many sections of the country this catch serves as a very convenient and attractive place for sparrows and other birds which disfigure the side of the house an drender themselves most objectionable, and to obviate this roosting on this catch we have cut from sheet stock, preferably non-oxidizing metal such as brass, a pair of star-shaped members 14 having a substantially cup-chaped body portion 15 with a plurality of radiating prongs 16.

This body portion with the prongs are drawn up preferably into somewhat of a cup shape and the bottom of the body is provided with a center hole as at 17.

Two of these star-shaped members thus formed are assembled with their cup portions extending in opposite directions with their prongs arranged to interlock and both of these members are loosely mounted upon the shank of a pin or screw 18 which may be driven into the side of a house to loosely mount the device directly above the blind catch whereby the device is adapted to rotate freely upon the shank of the pin or screw so that it will be impossible for a sparrow to light or roost upon the device itself, the device being placed so close to the blind as to effectually prevent sparrows from lighting or roosting on the catch.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. An anti sparrow roosting device comprising a pair of oppositely-disposed cup-shaped discs provided with a plurality of radiating interlocking prongs, and means for securing said device to the side of a house above the blind catch.

2. An antisparrow-roosting device comprising a pair of oppositely-disposed cup-shaped members each having a plurality of radiating prongs arranged to interlock with those of the other members each member being provided with a hole through which a pin may be passed for rotatably securing the device to the side of a house above the blind catch.

In testimony whereof we affix our signatures.

FREDERICK E. POWELL.
PETER M. McNARY.